United States Patent Office 3,223,659
Patented Dec. 14, 1965

3,223,659
WATER DISPERSIBLE AND WATER SOLUBLE ALKYDS COMPRISING POLYALKYLENE GLYCOL, MONOCARBOXYLIC ACID, DICARBOXYLIC ACID, AND POLYOL
Gerald M. Curtice and Milton Dale Saunders, Minneapolis, Minn., assignors to Archer-Daniels-Midland Company, Minneapolis, Minn., a corporation of Delaware
No Drawing. Filed May 18, 1962, Ser. No. 195,964
14 Claims. (Cl. 260—22)

This invention relates to a new and useful method of manufacturing low acid value non-oxidizing alkyd resins that are self-dispersible in water (and water soluble) and the products derived therefrom. This invention more particularly provides a method of manufacturing water dispersible and water soluble low acid value non-oxidizing alkyd resins from monobasic and polybasic carboxylic acids (of the non-oxidizing fatty acid and non-oil type) which are esterified with two or more polyhydric alcohols one of which is polyethylene glycol or polypropylene glycol and the useful coating compositions derived therefrom.

Non-oxidizing describes those resins which do not cure or cross-link to give useful insoluble coatings through the absorption of oxygen and subsequent polymerization. Curing of these non-oxidizing resins is by other means than oxidation to give hard, insoluble, and durable film.

There has been an ever increasing trend toward the use of aqueous vehicles in coating compositions. The remarkable growth in the use of these water base materials has been due primarily to several factors:

(1) The substitution of water for organic solvents greatly reduces the cost of the coating material and eliminates the need for costly solvents which are later evaporated and are thus lost to the final product;

(2) The use of water as a diluent eliminates the flammability hazard which high volatile solvents present, and (3) The sometimes disagreeable odors of the solvents are eliminated.

We are aware that water dispersible high acid value modified alkyds of a self-drying (oxidizing) character used in combination with coupling solvents or emulsifying agents form useful coating compositions. However, the high acid value of modified alkyds generally detract from overall coating performances and durability of the oxidizing coating is less than desired. In addition, conventional emulsion paints are stabilized with a protective colloid such as glue, casein, gum arabic, polyvinyl alcohol, starch a cellulose derivative all of which are more or less susceptible to microbe and fungus attack, and being water sensitive reduce the water resistance and outside durability of paints based on such emulsions.

In United States Patent Numbers 2,634,245 by Arndt and 3,001,961 by Armitage, water dispersible drying oil modified alkyd resins utilizing a polyethylene glycol have been described. Heretofore, however, a useful self dispersible and water-soluble baking enamel has not been produced from non-oxidizing fatty acids and/or non-oil carboxylic acid modified alkyd resins which do not require conventional stabilizers. These disadvantages are eliminated in the present invention.

Accordingly, it is an object of this invention to provide a high gloss baking enamel derived from a non-oxidizing, low acid value, self-dispersible and water soluble alkyd which is capable of being heat converted with a cross-linking agent to form improved highly durable films insensitive to water and with excellent outside durability.

Another object of this invention is to provide non-oxidizing low acid value, water soluble alkyd resins that are self dispersible and soluble in water.

An additional object of this invention is to provide water soluble and water-dispersible low acid value non-oxidizing alkyd resins comprised of the reaction product of saturated monobasic and dibasic carboxylic acid materials and anhydrides wherein the carboxylic acids are of the non-oil aromatic or aliphatic type containing 7 to 14 carbon atoms or a non-oxidizing fatty acid containing 6 to 18 carbon atoms or a combination of the two.

A further object of this invention is the novel method of manufacturing the herein described self-dispersible and water soluble non-oxidizing alkyd resins.

A further object of this invention is the method of producing durable coating compositions by combining the herein described self dispersible and water soluble modified alkyd resin with a water soluble cross-linking resin, and the improved useful products derived therefrom.

To accomplish the foregoing and related ends, this invention then comprises the features hereinafter more fully described and inherent therein, and as particularly pointed out in the claims, the following description setting forth in detail certain illustrative embodiments of the invention and improvement, these being indicative, however, of but a few of the various ways in which the principle of the invention may be employed.

The invention, then, is a process for the production of self-dispersible and water soluble non-oxidizing alkyd resins which are made water soluble or water dispersible by a selective method of reacting monobasic and polybasic carboxylic acids or anhydrides with two or more polyhydric alcohols, one of which is polyethylene glycol or polypropylene glycol or combinations thereof, and where the said carboxylic acids are of the non-oil type or non-drying fatty acids or a combination of the two. The self dispersible and water soluble modified alkyds so formed are preferably used in conjunction with water soluble cross-linking amine-aldehydes, alkylated urea aldehydes or alkylated melamine resins. The resulting compositions are heat convertible to durable coatings. The incorporation of suitable cross-linking resins with the herein described low acid value non-drying alkyd resins forming durable resins and pigmented coatings is also within the scope of this invention.

By non-oxidizing non-oil monobasic carboxylic acids are meant aromatic and saturated aliphatic acids containing one carboxyl group such as isodecanoic, isooctanoic, benzoic and p-tertiary butyl benzoic acids, and the like containing 7 to 14 carbon atoms. By non-oxidizing acids we mean long chain saturated acids containing one carboxyl group and 6 to 18 carbon atoms. Typical non-limiting examples of non-oxidizing fatty acids include saturated fatty acids such as obtained from coconut oil, babassu oil, palm kernel oil, and the like and hydrogenated fatty acids and the like as known to the art. By non-oxidizing dibasic carboxylic acids are meant the aromatic and aliphatic saturated acids or anhydrides thereof containing two carboxyl groups and 4 to 10 carbon atoms. Typical non-limiting examples of these non-oxidizing dibasic acids and anhydrides include o-phthalic, isophthalic, adipic, glutaric, azelaic acids, and phthalic anhydrides.

For the practical employment of this invention two distinct types of polyhydric alcohols are necessary. The first is a polyethylene glycol or polypropylene glycol formed by the condensation of ethylene oxide and propylene oxide to yield a glycol having multiple ether linkages and average molecular weight in the range of 600 to about 6000. The preferred average molecular weight is 1000–2000. These products are known commercially as "Carbowaxes" or "Polyglycols E and P."

The second polyhydric alcohol component can be described as alcohols containing two or more hydroxyl groups and 2 to 8 carbon atoms. Typical non-limiting examples of this second polyhydric component include ethylene glycol, diethylene glycol, glycerine, trimethylol ethane, trimethylol propane, pentaerythritol, sorbitol, manitol and similar polyhydric alcohols which are esterified in the manner herein described.

This invention is best and preferably carried out by the hereinafter described two-step process. Less preferably a one step process can be used, however the results are not as satisfactory as the two-step process.

Step 1 comprises reacting monobasic acids or anhydrides or dicarboxylic acids or anhydrides or a combination of monobasic acids and dicarboxylic acids or anhydrides with the polyethylene glycol or polypropylene glycol at a temperature of about 410° F. to 550° F., preferably 425° F. to 475° F. for about one hour.

The amount of polyethylene glycol or polypropylene glycol used varies from 4% to 19% of the total weight of the final product. At levels of less than 4% the modified alkyd does not form suitable self dispersible and water soluble resins. Amounts greater than about 19% are of no further advantage in dispersing and solubilizing the modified alkyd and oftentimes are detrimental to the properties of the cured film. An excess of polyethylene glycol or polypropylene glycol will result in soft films which are not nearly as solvent resistant and alkali resistant as those within the limits of this invention. The preferred range is between about 8% to 15%.

By reacting the saturated monobasic or dicarboxylic acids or anhydrides with polyethylene glycol or polypropylene glycol in the first step, the glycol is more efficiently reacted with the carboxylic acids. The gylcols having high molecular weights esterify at slower rates than the more reactive lower molecular weight polyols. Thus, by first reacting the polyethylene glycol or polypropylene glycol in step 1 without additional polyhydric alcohols more efficient esterification is obtained.

Step 2 comprises adding to the reaction product of step 1 sufficient polyhydric alcohol other than polyethylene glycol or polypropylene glycol to have an excess of hydroxyl groups to acid groups of 14 to 30%, and heating to an acid value of less than about 10. The acid value is attained by reacting the product of step 1 with the added polyhydric alcohol for about 6 to 10 hours at a temperature of between about 420° F. and 550° F., but preferably between about 460° F. and 520° F. The time interval does not include heat up and cool down time.

As indicated the invention can be carried out by the less preferable one step process.

The one-step process comprises reacting monobasic acids or dicarboxylic acids or anhydrides or a combination thereof with two polyhydric alcohols one of which is polyethylene or polypropylene glycol for about 6 to 10 hours to an acid value of less than about 10 at a temperature of between 420° F. and 550° F., but preferably between about 460° F. and 520° F. The combination of polyhydric alcohols shown provide an excess of hydroxyl groups of 14 to 30% based on the available carboxylic acid groups.

The modified alkyd resin prepared from the above reaction process, having an acid value of not more than about 10 and preferably 9 or less, is then neutralized with a volatile type neutralizing agents as ammonium hydroxide, and amine or amide or any other like acid neutralizing organic base. The neutralized resin may then be dispersed in water. Depending upon the choice of reactants, the particular resin will be completely soluble or otherwise so completely dispersed in water as to form a clear solution. The resins or portions thereof which are somewhat less soluble but readily dispersible in water will form an opalescent solution with water at 40% non-volatile. The term self-dispersible as herein utilized is used in the sense known to those skilled in the art of obtaining a dispersion without the necessity of additional emulsifying, wetting and stabilizing agents.

As heretofore indicated, a neutralizing basic compound is added in an amount about chemically equivalent to the acidity of the reaction product of step 2. The neutralization aids in the ease of dispersing the resin in an aqueous solution. Although an alkali as ammonium hydroxide or any suitable inorganic or organic base can be used, we prefer to use an amine which is volatile at temperatures less than 375° F. Retention of the less volatile acid neutralizing agents in the formed and cured film lowers ultimate durability in outside applications. Typical non-limiting examples of preferred amines include triethylamine, diethyamine, dimethyethylamine and morpholine. The amines used in neutralization may be primary, secondary or tertiary. We, however, prefer a tertiary amine such as triethyl amine. The neutralized and dispersed alkyl resin will have a pH in the range of about 7.0 to about 9.5.

The concentration range of the several ingredients can be varied within the following limits. The percentages are based on the total weight of the reaction product.

Mono-saturated carboxylic acids 15 to 30%.
Saturated di-carboxylic acids 22 to 40%.
Polyethylene glycol or polypropylene glycol 4 to 19%.
Polyhydric alcohol other than polyethylene or polypropylene glycol 22 to 40%.
Reflux aid (boiling in the range of about 410° F. to 550° F.) 0–4%.

We have found that a small amount of carbitol acetate is desirable as a reflux aid but it is not necessary in the practice of our invention. Other similar high boiling reflux aids may also be used. It is also helpful to have a catalytic amount of a color stabilizer in the formation of the alkyd resin. While many of the color stabilizers known in the art such as butylacid phosphate and triphenyl phosphate and the like may be used the triphenyl phosphite is preferred. Esterification catalysts usually provide a final product with lower acid value in the normal reaction time. Although not necessary to the practice of the invention esterification catalysts such as para-toluene sulfonic acid, dibutyltindilaurate, dibutyltinoxide may be used.

The following are non-limiting examples which will serve to illustrate the manner in which the invention may be carried into effect:

*Example 1*

A resin was prepared from the following ingredients:

| | Parts by weight |
|---|---|
| A. Hydrogenated coconut fatty acids | 530 |
| B. Phthalic anhydride | 686 |
| C. Polyethylene glycol (average mol wet. 1450) | 280 |
| D. Triphenyl phosphite | 3.2 |
| E. Carbitol acetate | 40.0 |
| F. Trimethylol ethane | 579.0 |

The hydrogenated coconut, phthalic anhydride, polyethylene glycol, triphenyl phosphite and carbitol acetate were all heated together to a temperature of 500° F. and held for a period of one hour in a reactor under an atmosphere of nitrogen. The reactor was fitted with a mechanical stirrer, thermometer, water separator and a reflux condenser. The reaction mixture was thereafter cooled to 300° F. and the trimethylol ethane added. The temperature of the reaction mixture was raised to 510° F. and maintained at that temperature under agitation for 7½ hours at which time the acid value was 8.65.

The product, on cooling, was a clear non-oxidizing resin having a Gardner viscosity of K at 60% non-volatile in ethylene glycol mono butyl ether. The color was 7 on the Gardner scale.

The foregoing resin was thinned with water by the following procedure:

815.5 parts by weight of the resin prepared as described above and at 100% non-volatile were admixed with 12.75 parts by weight of triethylamine at a temperature of 165° F. in a system fitted for reflux. 1211.75 parts by weight of water was added over a period of 20 to 40 minutes. The heat was applied during the first half of the water addition, the mixture being well agitated during this addition.

*Example II*

A water-soluble resin was prepared from the following ingredients:

|   | Parts by weight |
|---|---|
| A. Para tertiary butylbenzoic acid | 401 |
| B. Phthalic anhydride | 148 |
| C. Adipic acid | 292 |
| D. Polyethylene glycol (average mol wet. 1450) | 165 |
| E. Triphenyl phosphite | 1.6 |
| F. Carbitol acetate | 20 |
| G. Trimethylol ethane | 416 |

The p-tert butylbenzoic acid, phthalic anhydride, adipic acid, polyethylene glycol, triphenyl phosphite and carbitol acetate were all heated together to a temperature of 500° F. and held for a period of one hour in a reactor under an atmosphere of nitrogen. The reactor was fitted with a mechanical stirrer, thermometer, water-separator and a reflux condenser. The reaction mixture was thereafter cooled to 300° F. and the trimethylol ethane added. The temperature of the reaction mixture was raised to 500° F. and maintained under agitation at that temperature for 8 hours.

The product, on cooling, was a clear, viscous non-oxidizing resin having an acid value of 6.5.

The resin at 60% non-volatile in ethylene glycol mono butyl ether had a Gardner viscosity of O to P and a Gardner color of 7.

A clear water solution was prepared from the foregoing resin by the following procedure:

345 parts by weight of the resin prepared as described above and at 100% non-volatile were admixed with 4 parts by weight of triethylamine at a temperature of about 165° F. in a system fitted for reflux, 514 parts by weight of water was added over a period of 20 to 40 minutes. The heat was applied during the first half of the water addition, the mixture being well agitated during this addition.

The resulting product was a clear solution which had the following properties:

| Non-volatile | percent | 40 |
|---|---|---|
| pH |  | 8.2 |
| Viscosity | cps | 460 |

*Example III*

This example illustrates the use of both a non-drying oil fatty acid and non-oil acids in preparing a water soluble resin from the following ingredients:

|   | Parts by weight |
|---|---|
| A. Para tertiary butylbenzoic acid | 301 |
| B. Hydrogenated coconut fatty acids | 122 |
| C. Phthalic anhydride | 222 |
| D. Adipic acid | 219 |
| E. Polyethylene glycol (average mol wet. 1000) | 165 |
| F. Triphenyl phosphite | 2 |
| G. Carbitol acetate | 20 |
| H. Trimethylol ethane | 410 |

The para tert butylbenzoic acid, hydrogenated coconut, phthalic anhydride, adipic acid, polyethylene glycol, triphenyl phosphate and carbitol acetate were reacted as described in Example II. After heating for one hour at 500° F. the temperature was dropped to 300° F. and the trimethylol ethane was added. The procedure as described in Example II was followed and the resulting resin was of a non-oxidizing character and had the following characteristices:

The viscosity at 60% non-volatile in ethylene glycol mono butyl ether was a Gardner L. The color was a Gardner 6. At 60% non-volatile in xylene the viscosity was a Gardner F.

The final acid value was 8.9.

After the resin product as above described was neutralized as described in Example II, it was dissolved in water to give a clear solution at 40% non-volatile.

*Example IV*

This example illustrates the use of polypropylene glycol in preparing a water dispersible resin.

The ingredients, amounts and process of Example III were repeated except that polypropylene glycol was substituted for polyethylene glycol.

The viscosity of the resulting non-oxidizing resin at 60% non-volatile in ethylene glycol mono butyl ether was a Gardner M. The color was a Gardner 6.

The foregoing resin was thinned with water as described in Example I and the resulting product was an opalescent solution.

*Example V*

This example illustrates the use of lauric acid, a saturated fatty acid, to produce a water soluble resin from the following ingredients:

|   | Parts by weight |
|---|---|
| A. Para tertiary butylbenzoic acid | 276 |
| B. Lauric acid | 140 |
| C. Phthalic anhydride | 278 |
| D. Adipic acid | 164 |
| E. Polyethylene glycol (average mol wt. 1450) | 175 |
| F. Triphenyl phosphite | 2 |
| G. Carbitol acetate | 30 |
| H. Trimethylol ethane | 412 |

A, B, C, D, E, F and G were reacted as described in Example II. The trimethylol ethane was added after heating A through C for one hour at 500° F. and subsequently cooling to 300° F. The reaction was then continued as further described in Example II.

The resulting non-oxidizing resin, upon cooling, had an acid value of 8.8 At 60% non-volatile in ethylene glycol mono butyl ether the Gardner viscosity was L and the Gardner color was 5. At 60% non-volatile in xylene the Gardner viscosity was F.

Upon neutralizing and subsequently dissolving in water as described in Example II the resulting product was clear solution at 40% non-volatile.

*Example VI*

This example illustrates the use of more than one polyhydric alcohol in step 2 of the reaction to produce a water soluble resin from the following ingredients:

|   | Parts by weight |
|---|---|
| A. Para tertiary butylbenzoic acid | 200 |
| B. Hydrogenated coconut fatty acids | 245 |
| C. Phthalic anhydride | 333 |
| D. Adipic acid | 110 |
| E. Polyethylene glycol (average mol wt. 1450) | 200 |
| F. Triphenyl phosphite | 2 |
| G. Carbitol acetate | 30 |
| H. Trimethylol ethane | 368 |
| I. Mono pentaerythritol | 38 |

A, B, C, D, E, F and G were reacted as described in Example II. After heating at 500° F. for one hour the reaction was cooled to 300° F. and the trimethylol ethane and mono-pentaerythritol were added. The reaction was then continued as described in Example II.

The resulting non-oxidizing resin upon cooling had an acid value of 9.0. The viscosity at 60% non-volatile in butyl Cellosolve was a Gardner I to J. The color was a Gardner 5.

The resin was subsequently neutralized as described in Example II and dissolved in water. The resulting product was a clear solution at 40% non-volatile.

Example VII

This example illustrates the use of a one step process in preparing a self dispersible water thinnable resin from the following ingredients:

| | Parts by weight |
|---|---|
| A. Hydrogenated coconut fatty acids | 272 |
| B. Phthalic anhydride | 343 |
| C. Polyethylene glycol (average mol wt. 4000) | 140 |
| D. Trimethylol ethane | 298 |
| E. Triphenyl phosphite | 1.6 |
| F. Carbitol acetate | 20 |

All reactants, A through F, were charged and heated together to a temperature of 500° F. under a nitrogen atmosphere. The reactor was fitted with a mechanical stirrer, thermometer, water separator and a reflux condenser. The reaction mixture was maintained at 500° F. under agitation for a period of 6.5 hours.

The resulting non-oxidizing resin, upon cooling, had an acid value of 8.9. At 60% non-volatile in ethylene glycol monobutyl ether the Gardner viscosity was M and the Gardner color was 5. The resin was subsequently neutralized as described in Example II and dispersed in water to give an opalescent solution at 40% non-volatile.

When the above described and illustrated alkyd resins are used in conjunction with a suitable cross-linking resin and preferably a water soluble amine-aldehyde cross-linking resin they form useful heat convertible and durable coating compositions. The various types of water soluble melamine-formaldehyde resins are the preferred cross-linking resins. Other cross-linking and water soluble resins may be used for example, urea-formaldehyde, alkyl substituted dimethylol urea, methylolated melamine and the like. In addition, if desired and less preferably organic soluble cross-linking resins or alkylated melamine formaldehyde resins and other known cross-linking resins may be used with a coupling solvent.

Typical resin type cross-linking agents may be:

| | Trade name |
|---|---|
| Phenol-formaldehyde | Admirez. |
| Methylated urea formaldehyde | RK005, RK016. |
| Butylated melamine formaldehyde | Resimene 881, Resimene 882. |
| Methylated melamine formaldehyde | RH208. |
| Methylated melamine formaldehyde | Cymel 7273–7. |

Paints and films formulated from the above compositions will cure at temperatures varying from about 225° F. to about 375° F. in about 10 to 60 minutes or more. At the lower temperatures, longer curing times are required. A preferred baking schedule is about 30 minutes at 250° F. to 300° F. for obtaining the preferred baked film, as herein contemplated. A three mil film baked as described above, will result in a flexible film of high gloss having Sward hardness of about 14 to 40 depending on cross-linking resin and alkyd design. Exposure tests with coating compositions using this invention have shown excellent exterior durability.

Conventional colors and pigments such as titanium dioxide, basic lead carbonate chrome yellow and others can be incorporated in the usual amounts into the herein described alkyd resins by conventional methods of grinding.

Example VIII

This example illustrates the use of the resin prepared in Example IV in a paint formulation.

A mill base was made by grinding 135 parts by weight of the resin prepared in Example IV which was at 40% non-volatile in water with 200 parts by weight of a TiO$_2$ pigment (R–900) with 5 parts weight of odorless mineral spirits and 40 parts by weight of water.

100 parts by weight of the above described mill base and 78.5 parts by weight of the resin prepared in Example IV at 40% non-volatile in water were blended with 16.6 parts by weight of a water soluble melamine formaldehyde (HR208).

This paint had a total solids of 56.9% and a vehicle non-volatile of 41%. The binder to pigment ratio was 0.9 to 1.

A three mill drawdown was made which was subsequently air dried for 15 minutes and then baked at 250° F. for 30 minutes. The resulting cured coating was a high gloss flexible enamel that had a Sward hardness of 30. This coating had good caustic and xylene resistance. The gloss when measured in a Gardner Gloss Meter was 93 at 60° and 71 at 20°.

Paints formulated with this invention give Gardner Gloss Meter readings in the range of 85 to 98 at 60° and 60 to 88 at 20°.

Besides the advantage of having a coating vehicle of self dispersing and water soluble non-oxidizing modified alkyd resins in aqueous solution in the application of the invention, there are the further advantages in that conventional coupling solvents and stabilizers are not required in conjunction with utilizing non-oxidizing and non-oil type carboxylic acids to obtain high gloss enamels that are made insoluble to water on curing and possess excellent outside durability.

The unusual and surprising factor is in modifying the alkyd with a saturated component and obtaining self water dispersible and water soluble alkyds having acid values of about 10 or less.

These new alkyds with cross-linking resins are discovered to yield improved high gloss enamels exhibiting exceptional solvent resistance, adhesion, and exterior durability. In contrast to the usual oxidizing type coatings, the products of this invention being non-oxidizing, the enamels show excellent color and color retention, flexibility with no embrittlement, and long term exterior durability.

As many variations and modifications of this invention as hereinto set forth may be made without departing from the spirit and scope thereof, the specific embodiments are given by way of example illustrative of the improvements provided which is to be limited only by the terms of the claims.

We claim:

1. The process of producing a self-dispersible and water soluble non-oxidizing alkyld resin, which comprises:
   (I) forming a first mixture of (A) polyalkylene glycol selected from the group consisting of polyethylene glycol and polypropylene glycol having a molecular weight between 600 and 6,000; (B) monocarboxylic acid selected from the group consisting of [1] non-oxidizing fatty acids of from 6–18 carbon atoms, [2] aromatic and saturated aliphatic monocarboxylic acids of from 7–14 carbon atoms, other than fatty acids, and [3] mixtures of [1] and [2]; and (C) material selected from the group consisting of aromatic dicarboxylic acids, saturated aliphatic dicarboxylic acids, and anhydrides thereof, of from 4–10 carbon atoms, and mixtures of the same; and reacting said first mixture at temperatures between 410° and 550° F.;
   (II) subsequently adding to the mixture at least one polyhydric alcohol, other than said polyalkylene glycols, to thereby form a second mixture, said polyhydric alcohol having at least two hydroxyl groups and containing 2–8 carbon atoms, reacting said second mixture at temperatures between 410° and 550° F., continuing said reacting until an acid number of not more than about 10 is obtained, and neutralizing the residual acidity with an acid neutralizing agent which is volatile at temperatures below about 375° F., thereby effecting the production of said alkyd resin.

2. The process of claim 1 wherein the alkyd resin is prepared from about 15 to 30 parts by weight of said monocarboxylic acid; about 22 to 40 parts by weight of said material selected from the group consisting of said dicarboxylic acids, their anhydrides and mixtures of the same; about 4 to 19 parts by weight of said polyalkylene glycol; about 22 to 40 parts by weight of said polyhydric alcohol other than polyalkylene glycols; and about 0 to 4 parts by weight of a reflux aid which boils in the range of about 410° to about 550° F.

3. Alkyd resin produced by the process of claim 1.

4. An aqueous dispersion of alkyd resin produced by the process of claim 1.

5. An aqueous coating composition comprising alkyd resin produced by the process of claim 1 and water soluble cross-linking resin selected from the group consisting of phenol-formaldehyde resin, urea-formaldehyde resins, and melamine-formaldehyde resins.

6. The coating composition of claim 5 wherein the water soluble cross-linking resin is a melamine-formaldehyde resin.

7. The coating composition of claim 5 spread in film form on a substrate and baked at temperatures of from 225° to 375° F. for a period of about 10 to 60 minutes to effect the conversion of said water dispersible and soluble alkyd resin to a water insoluble state.

8. The process of producing a self-dispersible and water soluble non-oxidizing alkyd resin which comprises forming a mixture of (A) at least two different polyhydric alcohols, one of which is polyalkylene glycol selected from the group consisting of polyethylene glycol and polypropylene glycol having a molecular weight between 600 and 6,000, the other of which is a different polyhydric alcohol containing at least two hydroxyl groups and 2-8 carbon atoms; (B) monocarboxylic acid selected from the group consisting of [1] non-oxidizing fatty acids of from 6-18 carbon atoms, [2] aromatic and saturated aliphatic monocarboxylic acids of from 7-14 carbon atoms, other than fatty acids, and [3] mixtures of [1] and [2]; and (C) material selected from the group consisting of aromatic dicarboxylic acids, saturated aliphatic dicarboxylic acids, and anhydrides thereof, of from 4–10 carbon atoms, and mixtures of the same; reacting said mixture at temperatures between about 410° and 550° F.; continuing said reacting until an acid number of not more than about 10 is obtained; and neutralizing the residual acidity wit an acid neutralizing agent which is volatile at temperatures below about 375° F., thereby effecting the production of said alkyd resin.

9. The process of claim 8 wherein the mixture is prepared from about 15 to 30 parts by weight of said monocarboxylic acid; about 22 to 40 parts by weight of said material selected from the group consisting of said dicarboxylic acids, their anhydrides and mixtures of the same; about 4 to 19 parts by weight of said polyalkylene glycol; about 22 to 40 parts by weight of said other polyhydric alcohol; and about 0 to 30 parts by weight of a reflux aid which boils in the range of about 410° F. and 550° F.

10. Alkyd resin produced by the process of claim 8.

11. An aqueous dispersion of alkyd resin produced by the process of claim 8.

12. An aqueous coating composition comprising alkyd resin produced by the process of claim 8 and a water soluble cross-linking resin selected from the group consisting of phenol-formaldehyde resins, urea-formaldehyde resins, and melamine-formaldehyde resins.

13. The coating composition of claim 12 wherein the water soluble cross-linking resin is a melamine-formaldehyde resin.

14. The coating composition of claim 13 spread in film form on a substrate and baked at temperatures of from 225° to 375° F. for about 10 to 60 minutes to effect the conversion of said water dispersible and soluble alkyd resin to a water insoluble state.

References Cited by the Examiner
UNITED STATES PATENTS

| | | | |
|---|---|---|---|
| 2,634,245 | 4/1953 | Arndt | 260—22 |
| 2,729,609 | 1/1956 | Tess et al. | 260—22 |
| 2,944,991 | 7/1960 | Hart | 260—22 |
| 3,001,961 | 9/1961 | Armitage et al. | 260—22 |
| 3,128,260 | 4/1964 | Langstroth | 260—22 |

LEON J. BERCOVITZ, *Primary Examiner*

UNITED STATES PATENT OFFICE
CERTIFICATE OF CORRECTION

Patent No. 3,223,659                                    December 14, 1965

Gerald M. Curtice et al.

It is hereby certified that error appears in the above numbered patent requiring correction and that the said Letters Patent should read as corrected below.

Column 3, line 62, for "agents" read -- agent --; column 4, line 11, for "diethyamine" read -- diethylamine --; column 4, line 15, for "alkyl" read -- alkyd --; same column 4, line 51 and column 5, line 14, for "wet.", each occurrence, read -- wt. --; column 8, line 3, for "HR 208" read -- RH 208 --; line 46, for "alkyld" read -- alkyd --; column 10, line 3, for "wit" read -- with --.

Signed and sealed this 3rd day of January 1967.

(SEAL)
Attest:

ERNEST W. SWIDER                                                   EDWARD J. BRENNER
Attesting Officer                                                        Commissioner of Patents